United States Patent
Joseph et al.

(10) Patent No.: US 11,022,814 B2
(45) Date of Patent: Jun. 1, 2021

(54) HIGH SPEED PROJECTION ONTO DYNAMIC MOVING OBJECTS

(71) Applicant: Disney Enterprises, Inc., Burbank, CA (US)

(72) Inventors: Daniel M. Joseph, Windermere, FL (US); Dumene Comploi, Los Angeles, CA (US); Jessica A. Klouda, Lisle, IL (US); Thomas F. LaDuke, Orange, CA (US); Edgar F. Mahnke, IV, Winter Garden, FL (US); Mark A. Reichow, Santa Clarita, CA (US); Thomas T. Tait, Santa Clarita, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 276 days.

(21) Appl. No.: 15/981,706

(22) Filed: May 16, 2018

(65) Prior Publication Data
US 2019/0353917 A1    Nov. 21, 2019

(51) Int. Cl.
G02B 30/54    (2020.01)
G03B 21/56    (2006.01)
G06T 7/20     (2017.01)

(52) U.S. Cl.
CPC .......... *G02B 30/54* (2020.01); *G03B 21/562* (2013.01); *G06T 7/20* (2013.01)

(58) Field of Classification Search
CPC .......... G03B 30/52; G03B 21/562; G06T 7/20
USPC .......................................................... 353/10
See application file for complete search history.

(56) References Cited

U.S. PATENT DOCUMENTS

| 6,559,840 B1* | 5/2003 | Lee .................. G02B 27/06 345/31 |
| 2006/0038965 A1* | 2/2006 | Hennes .............. G03B 21/26 353/94 |

OTHER PUBLICATIONS

Carnegie Mellon, "Programmable Automotive Headlights," http://www.cs.cmu.edu/smartheadlight/, Retrieved on Dec. 28, 2018, 6 pages.
University of Tokyo, "Ishikawa Senoo Laboratory", https://www.youtube.com/user/IshikawaLab, Retrieved on Feb. 4, 2019, 4 pages.

* cited by examiner

*Primary Examiner* — Jerry L Brooks
(74) *Attorney, Agent, or Firm* — Dorsey & Whitney LLP

(57) ABSTRACT

A system for projecting content, such as images, onto a moving object. The system includes a tracking module, a prediction module, a projection generation module, and a projector. In one example, the tracking module and the prediction module provide commentary data to the projection generation module, which uses the data to select or render content for projection on the object at a select location. The complementary data includes tracked position information and predicted position information.

11 Claims, 12 Drawing Sheets

HIGH SPEED PROJECTION ONTO DYNAMIC MOVING OBJECTS

TECHNICAL FIELD

The technology described herein relates generally to methods and systems for projecting content onto moving objects and projection in environments with moving objects.

BACKGROUND

Projecting media onto objects can be used to create various illusions and effects, but aligning the projected light with the object can be difficult, especially in instances where the object or surface moves or otherwise changes shape or position. Various techniques have been developed to solve this issue.

One technique has been to project light only onto slow moving objects, where the object can be easily tracked and the projected content modified within the movement time of the object. An example of this technique is the projection of light onto stage actors as they move across the stage. However, this technique requires that the object move sufficiently slowly that latencies introduced with the object tracking do not substantially affect the projection, which limits the application of the technique to only slowly moving and relatively large objects, and the light is not accurately mapped to the actor, which can cause blow-by, where the light is projected into other areas.

Another technique has been to broadcast light across a predetermined area (e.g., flood the area with the projected light) such that the light interacts with objects as the objects move into the predetermined area. With this technique, the light is not mapped to the objects, providing less control for the experience and causing both targeted and untargeted objects to be illuminated. Also, projection with this technique may experience blow by issues as the objects move quickly through the light field.

Yet another technique has been to synchronize projected content with object motion using timing triggers. With this technique, projected media is triggered based on a time code matching a mechanical motion time code. However, this technique limits the type of movement that can be accomplished, since it requires highly repetitive behavior that can be easily set to time codes, i.e., the behavior must be repeated in exactly the same manner with each performance. Further, minor discrepancies in timing can cause projection problems and typically systems require frequent re-syncing, forcing downtime for the projection environment.

SUMMARY

One example of the present disclosure relates to a system for projecting content, such as images, onto a moving object. The tracking module and the prediction module provide commentary data to the projection generation module, which uses the data to select or render content for projection on the object at a select location. The complementary data includes tracked position information and predicted position information.

Another example of the present disclosure includes a method for projecting content onto a moving object. The method includes receiving by computer tracked positional characteristics of the moving object from a tracking module, wherein the tracked positional characteristics correspond to actual positions of the moving object, receiving by the computer predicted positional characteristics of the moving object from a prediction module, where the predicted positional characteristics correspond to predicted positions of the moving object, determining by the computer an object position based on the tracked positional characteristics and the predicted positional characteristics, modifying or selecting projection content for projection onto the moving object based on the object position, and projecting the projection content onto the moving object.

Yet another example of the present disclosure includes a projection system for generating a volumetric image. The system includes a tracking module for tracking positional characteristics. a projection module in communication with the tracking module, wherein the projection module projects light, and a projection object positioned within a field of view of the projection module. The projection object includes a target area selected to interact with the projected light to generate an image portion and a motor in communication with the tracking module. The motor is operably coupled to the target area for moving the target are along a movement path and as the projection object moves along the movement path a projection volume is defined. Additionally, as the motor moves the target area, the tracking module tracks positional characteristic of the object to determine a first object position and provides the object position to the projection module and the projection module generates content for projection onto the object at discrete locations along the movement path based on the positional characteristics and projects the content onto the target area as the object is moved into each location by the motor. Further, the content projected at each discrete location defines a plurality of image portions along the movement path, wherein the image portions define the volumetric image.

SPECIFICATION

Figure 1:
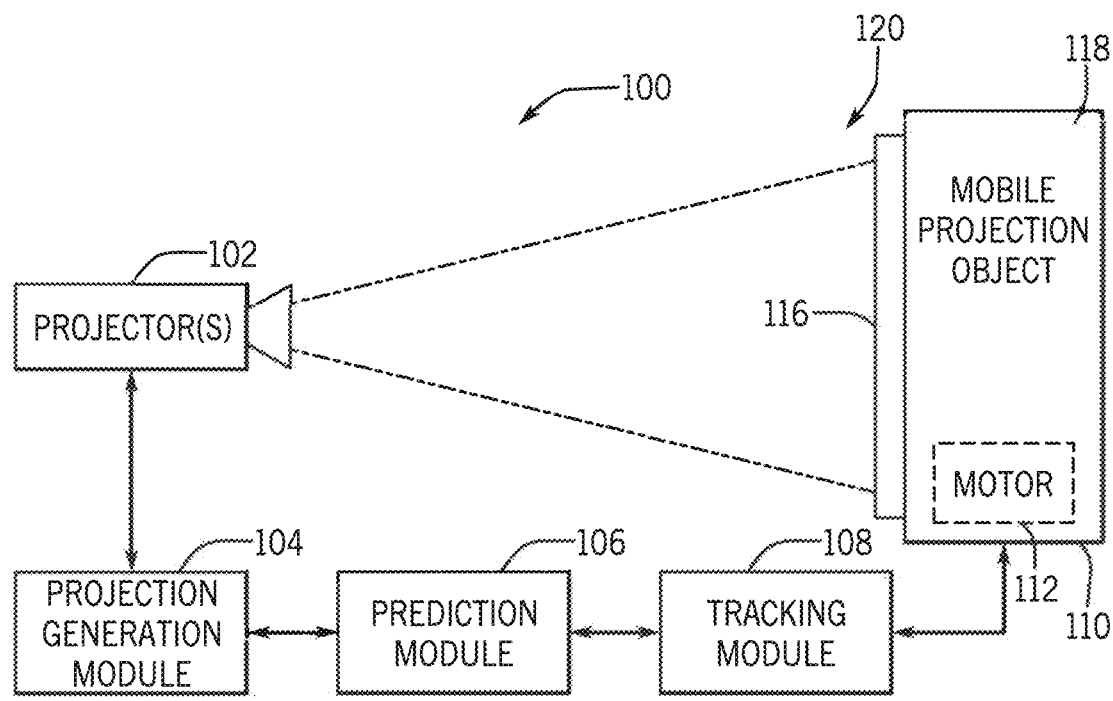
FIG. 1 is a block diagram of a projection system for projecting light onto objects.

The present disclosure is generally related to a projection method and system for projecting light onto moving objects. In some instances, the techniques can be used to project light onto rapidly and arbitrarily moving objects, such as water, snowflakes, confetti, foliage, water droplets, water "curtains" or waterfalls, flying objects (e.g., animals, insects, etc.), fish, projectiles, vehicles (e.g., unmanned aerial vehicles, autonomous vehicles, planes). In other instances, the techniques may be used to project light onto moving objects with at least some known or predictable movement path. In many instances, the object or the object movement require ultra-low lag time in the mapping process, as well as low latency in the projection process for the projection to accurately project onto the desired location on the object. In this manner, the method and system described herein can track and map content or light onto unsynchronized, rapidly moving objects.

In one embodiment, the projection system includes one or more projectors, a prediction module, a tracking module, a projection generation module, and a mobile projection object that the projector projects onto. The tracking module and prediction module work together to provide object positional information to the projection generation module, which can then generate or select content or light patterns for projection onto the object. The tracking module and the prediction module are scalable or otherwise variable to allow increased or decreased inputs to the object positional data. In other words, the tracking module and the projection module provide supplemental or complementary data to allow the system to accurately project light onto the moving object, such that if one type of data will increase the latency for the system above a predetermined threshold, the other type of data can be input to counteract the latency.

In one example, the projection object may be moving in a choreographed manner, such as in a predetermined pattern, and the known choreography can be used to supplement the real-time tracking done by a tracking sensor, such as a camera. The tracking data, along with the predicted data, can then be combined to generate content for projection onto the object at the next projection location, where the position of the object will have changed. In another example, the projection object may be a screen hanging from a moving object, such as a drone, and the moving object may have a predetermined movement or position (e.g., hover in position X), which may determine the low frequency position of the screen, but the screen may also include high frequency positional changes (e.g., ripple, waves, etc.) due to wind or other atmospheric conditions. These high frequency positional changes are unpredictable compared to the known movement pattern. In this example, the low frequency positional information is predicted using the prediction module and the high frequency positional information is tracked using the tracking module, which compensates for the unknown movement.

In another example, the low frequency characteristics may be "bulk" or large movement of the object and the high frequency characteristics may be the edge or contour movement (e.g., appendage or movement around the edges of the object or interior edges formed by varying surface features of the object) and in this example, the low frequency characteristics may be tracked whereas the high frequency characteristics are predicted. The projection technique can be used for both small objects where the number of pixels forming edges of the object are equal to or larger than the number of pixels forming the interior of the object, as well as large objects where the number of perimeter edge pixels is much smaller than the number or percentage of interior pixels. In instances of small objects, the techniques may be applied to both the interior and exterior pixels, whereas in small objects, the bulk body pixels may be tracked, whereas the edge pixels may be predicted.

In one embodiment, at least one characteristic of the object or the projection environment is selected or modified to generate an enhanced projection surface or environment. For example, the material for the object or a coating for the object may be selected that is preferentially reflective, absorptive, or emissive of certain wavelengths, which allows the object to more easily be tracked by the tracking module. In other words, the projected object can be modified or selected to highly contrast with background or non-targeted objects, which further enhances the ability of the system to map projection onto the object.

In an illustrative example, the projection mapping system is used with a thin projection object, e.g., a bar that moves rapidly in a predetermined manner, such as circle. In this example, the projection object includes a targeted surface having an ambient light rejecting material (e.g., ambient light rejecting film or projection film, paint) and at least one non-targeted surface with light absorbing material, e.g., black flocked fabric). With this configuration, when directional light from the projector impacts the targeted surface, an image is visible, but when ambient light or non-directional light impacts the targeted surface, the light is diffused. Further, when light impacts the non-targeted surface, the light is absorbed making the non-targeted surface "invisible" to a viewer. The projection object has a known movement path, which is input to the projection module to allow faster generation of the content based on the next known position of the object, further the tracking system will track the actual position of the object and provide feedback to or otherwise refine the projected content. As the projection object moves, such as in a circular track and multiple projects project onto it, a 360 degree viewable image can be formed (e.g., an image cone), appearing as a three dimensional object or a hologram.

In many embodiments, the systems and methods presented herein are able to reduce overall system lag time to be below 1.6 ms. Where the system lag includes tracking lag, rendering lag, and projection lag. Keeping the lag below 1.6 ms allows the lag to become imperceptible to human viewers, allowing any blow by or other artifacts that may occur during the lag time to be insubstantial and also imperceptible.

In some examples, processing, computation, memory, and rendering resources can be applied judiciously to select pixels or portions of the object, rather than equally across all aspects of the object or frame. In conventional projection techniques, all pixels of an object are treated the same with respect to computational resources. In the present disclosure, resources are dynamically applied or weighted so as to decrease computation resources dedicated to portions of the object or frame that are more quickly determined and apply those resources to the more difficult to detect portions of the object. This selective or intelligent application helps to save resource time and utilize easier tracking sections to decrease overall system lag.

FIG. 1 is a simplified view of a projection system 100 including one or more projectors 102, a rendering module 104 or engine, a prediction module or engine 106, a tracking module 108, and a mobile projection object 110 which may include a motor 112. Various components of the projection system 100 may be in communication with one another, such as in electrical communication. In some embodiments, the system 100 may form a closed loop or feedback system, with the tracking module providing feedback into the projection module and/or projector to ensure accurate mapping of light onto the projection object (e.g., light impacting only the desired location on the object, without blow by or misalignment).

The projector 102 projects light, such as images, media, content, or the like, onto the projection object 110. The content projected is selected or generated by the rendering module 104 based on a positional data for the projection object 110, the positional data includes predicted data determined by the prediction module 106 and tracked data determined by the tracking module 108.

The projector 102 is any type of device that can project light, such as images, content, or the like, and projects light onto the projection object 110. In some examples, the projector 102 is a digital light processor (DLP) projector, video projector, liquid crystal based video projector, or laser scanning, dire. In some embodiments, the projector 102 is selected to have a frame rate that substantially matches the movement rate of the object and in some embodiments is around 1000 frames per second. However, in other embodiments, other frame rates can be used. The projector 102 may include on-board computational components that processes image data received from the rendering module 104 to prepare it for projection. In these instances, select operations of the rendering module may be performed by the projector 102, depending on the type of projector used, as well as the content being projected.

Figure 2A:
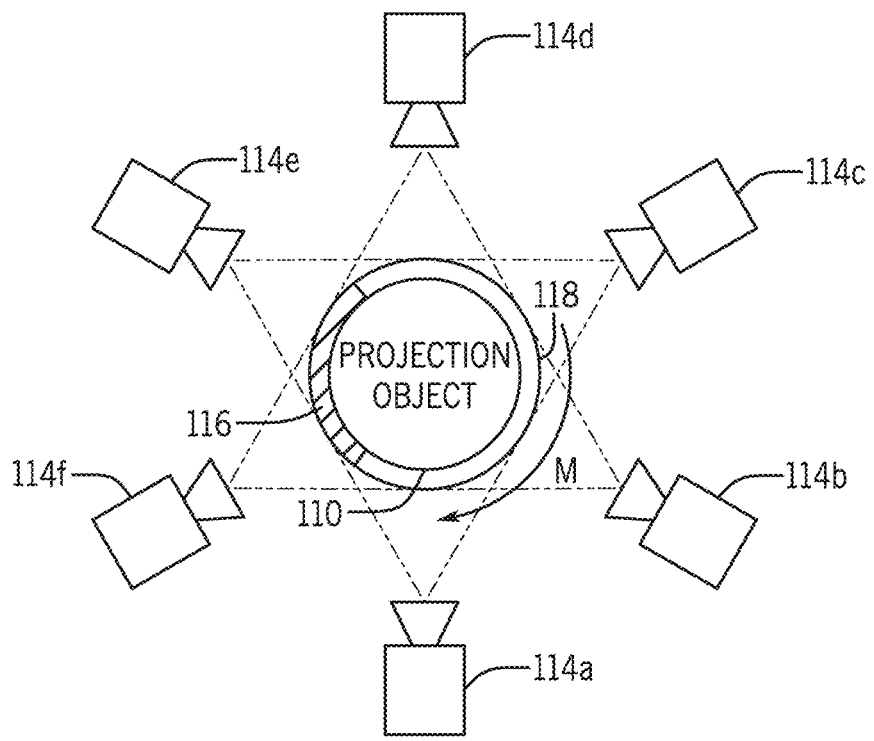
FIG. 2A is a top plan view of an illustrative example of the projection system of FIG. 1.
Figure 2B:
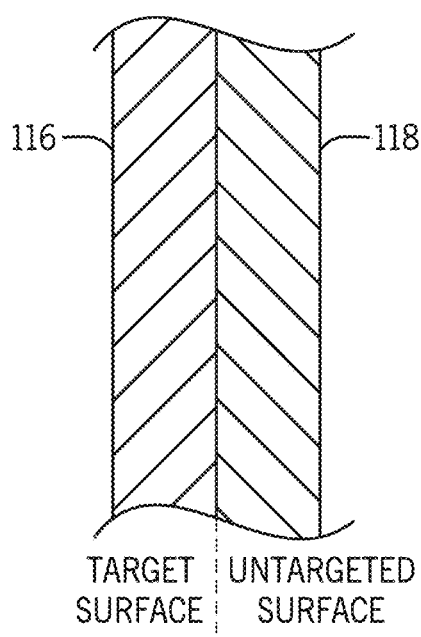
FIG. 2B is a cross-sectional view of the projection object of FIG. 2A.

The projector 102 may include multiple projectors spaced around a projection environment 120. For example, as shown in FIG. 2A, the projector 102 may include multiple projectors 114a, 114b, 114c, 114d, 114e, 114f spaced around the projection object 110 at different locations in order to project onto different surfaces of the projection object 110 or project onto similar surfaces, but at different times and/or locations of the projection object 110. In examples where a 360 degree viewable projected appearance is desired, the system 100 may include at least three projectors spaced around the projection object 110 to cover 360 degrees within the projection environment 120.

In some embodiments, the projector 102 may be formed as an active projection or direct view display. For example, the projector 102 may be formed as a light emitting diode screen, organic light emitting diode screen, or the like. In these instances, the object may move in front of the screen and the content emitted may be changed based on the location of the object in front the screen. Other projector 102 examples include multi-planar displays, alternative reality configurations (e.g., goggles), laser particle media, or the like.

The rendering module 104 renders, selects, focuses, and/or generates content for projection by the projector 102. In some embodiments, the rendering module 104 receives input or original content that is to be modified for projection onto the projection object 110. The rendering module 104 then modifies, warps, or selects content for projection depending on the position of the object, e.g., the location and configuration of the object. For example, the rendering module 104 may include one more graphic processing units (GPUs), real time game rendering engine, computer processing units (CPUs), field programmable gate arrays (FPGA), key frame alpha channel, or the like, that receive or access input content and then modify or render the content based on updated positional information about the object.

The prediction module 106 predicts or estimates positional information about the target area 116 and/or projection object 110. The prediction module 106 may be a computer implemented software module that receives input data corresponding to the movement of the projection object 110 and processes the data to predict positional information corresponding to a future position of the object 110 at a period in time. a As some examples, the prediction module 106 can include a Kalman filter, physics based prediction algorithms (e.g., ball tracking algorithms), Bayesian predictors, look up tables with accuracy statistics, or the like.

The tracking module 108 tracks or senses positional information of the object 110. In some embodiments, the tracking module 108 tracks the object optically (e.g., camera), mechanically (e.g., direct connection to object, motor 112 tracking, linkage movement), senses other characteristics (e.g., magnetic sensor), or a combination of two or more tracking types. The tracking module 108 may include components that capture positional information of the object 110, as well as components that act to enhance the positional information for capture.

In some examples, the tracking module 108 may be a camera that captures images of the object 110 at various instances in time and the captured images are used to determine positional information of the object 110 at the captured time. As a specific example, the tracking module 108 may be an infrared (IR) camera, forward looking IR camera with selected temperature ranges, a thermal camera, or the like, that captures select light wavelengths. In these embodiments, the tracking module 108 is selected based on the object 110 and/or target area 116, e.g., the object 110 may be IR absorptive and the tracking module 108 may include an IR camera that captures an IR signature corresponding to the projection area. In these embodiments, the tracking module 108 may include an IR emitter that emits IR light into the projection environment 120, allowing easier tracking of the projection object 110 as it absorbs the IR light and images of the projection environment 120 are captured.

In examples where the tracking module 108 includes a camera, the camera may be any device capable of capturing still or video images. The camera may capture full color images and/or monochromatic images, and may use any type of filter such as one or more color filters. Often, the tracking module or camera will be registered or otherwise placed in a known position with the environment, such that the specific orientation and location of the camera relative to the projection object is known.

Other examples of the tracking module 108 including a tracking sensor that directly senses positional information. For example, the tracking module 108 may include a magnetic sensor (e.g., Hall effect sensor), encoder (e.g., motor encoder) depth sensor, 3D camera, time of flight camera, acoustic sensors, electromagnetic sensor, radar, lidar, one or more accelerometers, one or more gyroscopes, light sensors (e.g., visible, invisible, light detection), temperature (e.g., infrared detection), reflection or absorption sensors, or the like, that are attached or otherwise configured to sense the positional information from the object 110.

In instances where multiple projectors 102 are used with the system 100, the targeting module may include multiple trackers and/or may "handoff" between the various projectors in terms of providing positional information for the object for projection. In some embodiments, the tracking module 108 may be configured to track a 3D field within the projection environment 130.

The projection object 110 is an object onto which the projector light is targeted or mapped. The projection object 110 may be a movable object and include a motion module, such as a motor 112. Examples of the projection object 110 are shown in FIGS. 6-12. Other examples of the projection object 110 may include an animatronic object, a ride vehicle, surface, or the like. The projection object 100 may be moved on a movement path M (see FIG. 2A), which may be predetermined, known, or may be random or otherwise unpredictable. It should be noted that in some embodiments, the projection object 110 may remain stationary and the projector 102 itself may move. For example, in one embodiment, the projector 102 may be mounted on a moving vehicle, such as a ride vehicle, and the projection object 110 may be the ride environment, such as a space ahead of the vehicle. In this example, the tracking and prediction modules may be used to determine the motion of the vehicle and assess the projection environment ahead of the vehicle's position.

Often, the projection object 110 may include a targeted area 116 for projection and a non-targeted area 118, where the projected light is mapped to the targeted area 116. The targeted area 116 is selected to assist the tracking module 108 in tracking the positional information of the object 110. The non-targeted area 118 may include other areas or portions of the projection object 110 where the light is not targeted. In some embodiments, the entire object 110 may be targeted (i.e., the targeted area 116 is defined as the entire object or outer surface of the object) and in these instances the untargeted surface may be omitted. The target surface 116 may include one or more coatings, features, or materials that reduce the computational complexity of tracking the object by the tracking module 108 and/or include features that enhance the projection of the light onto the object. The target surface 116 tracking enhancement may be passive, e.g., inherent property of the material that has a trackable characteristic, or may be active, e.g., emit certain characteristics, such as emitting light or a heat signature.

In one example, the target surface 116 includes an ambient light rejecting material or coating (e.g., gray paint), such that ambient light in the projection environment 120 is diffused when impacting the target surface 116 of the object 110. In another example, the target surface 116 is IR absorptive and visible reflective, to generate a strong IR outline that can be easily tracked by the tracking module 108. Alternatively, the target surface 116 may be IR reflective and visible absorptive. In another example, the target surface 116 includes heating or cooling elements or is otherwise selected or chosen based on a particular thermal signature.

The non-targeted surface 118 or area may also include features to reduce the reflectance and/or tracking of the surface 118. In one example, the non-targeted surface 118 includes a light absorptive material or coating, such as a black flocked fabric or black paint, that absorbs light, such that the non-targeted areas 118 may appear "invisible" or otherwise be difficult to view by a viewer.

Figure 3:
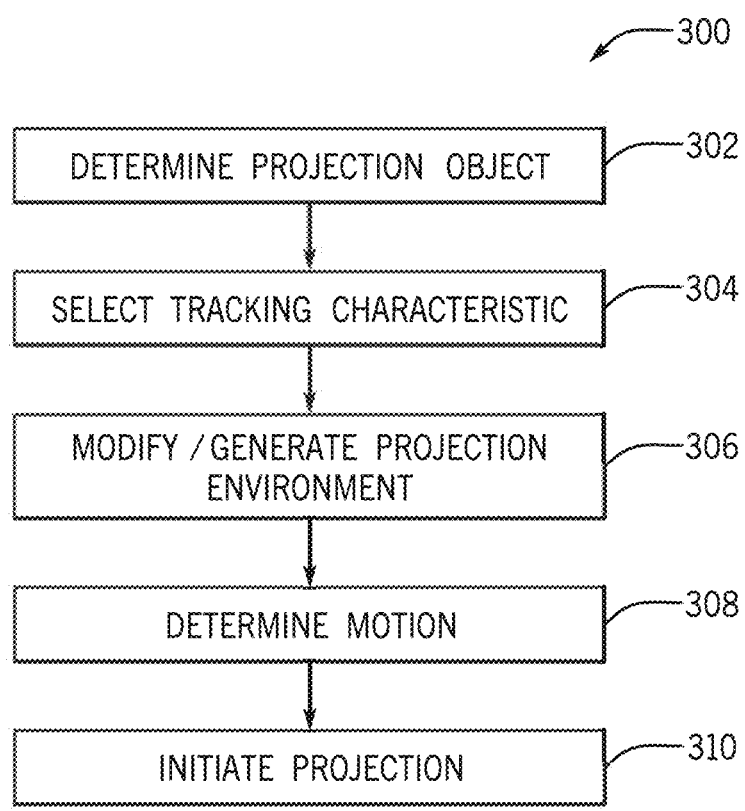
FIG. 3 is a flow chart illustrating a method for enhancing trackable characteristics of the projection object.

FIG. 3 is flow chart of an illustrative method for selecting or varying characteristics for use with the projection system 100. The method 300 may begin with operation 302 and a projection object 110 is selected. For example, the projection environment 120 and the select object to be illuminated or impacted by light from the projector 102. Once the projection object 110 is selected, the method 300 proceeds to operation 304 and a tracking characteristic is selected. The tracking characteristic is selected based on the tracking module 108 and includes the type of features or elements that the tracking module 108 will use to track the positional information of the object 110 and/or target area 116. Examples of the tracking characteristics include IR patterns or signatures, thermal characteristics, magnetic characteristics, visible light patterns, sound characteristics, and so on.

Once the desired tracking characteristic is selected, the method 300 proceeds to operation 306 and the projection object 110 is modified or enhanced to boost the track-ability of the projection object 110 or to increase contrast between the projection object 110 and the environment 120. In one example, the target area 116 is connected to material or coating that enhances the IR absorption or reflection of the projection object 110, increasing the ability of an IR detector in the tracking module 108 to locate the positional information of the object 110. In another example, the projection object 110 is modified to include an active emission of energy (e.g., light, heat) or an absorption of energy (e.g., cooling, light). The object 110 may be modified, such as by including a coating on the object (e.g., painting), connecting a material to the object (e.g., lamination, adhesive, fasteners), or the like. In some instances, the modification of the object 110 is to enhance characteristics already present or inherent to the object, e.g., being emissive or reflective for certain light wavelengths. In these instances, the tracking characteristic is selected based on inherent properties of the object and the enhancement of the object is to boost the trackability of the inherent characteristics. It should be noted that only select portions of the projection object 110 may be modified, e.g., edges and contours may be modified, whereas the larger or bulk portions, such as the body of the object, may not be modified. The portions of the object 110 that are enhanced for tracking may be selected based on performance or rendering times of the system.

In some embodiments, the projection environment 120 may also be modified to enhance the trackability of the object 110. For example, the projection environment 120 may be flooded with visible light or IR light to allow the object 110, which may be either visible or IR light absorptive, stand out more clearly against the background. As another example, the projection background could be heated or cooled to a predetermined temperature range that may be different from (e.g., below or above a threshold) from the object 110 characteristics. This allows the tracking module 108 to more easily separate the object and the environment from one another. In a related example, the background or projection environment 120 (or even select objects within the projection environment 120) can be illuminated with select light wavelengths (e.g., a select color) that is different from the projection object 110 and/or target area 116 color.

In many embodiments, during operation 306 the object 110 and/or the projection environment 120 are selected, treated, modified, or enhanced to increase the contrast or otherwise increase the detection of the projection object 110 within the projection environment 120, e.g., increase or optimize the contrast between the object and the environment.

In some embodiments, the target area 116 and/or projection object 110 may also be modified or enhanced to increase the projectability of the content, e.g., increase brightness and contrast. For example, the target area 116 may include a coating or material that absorbs ambient light and reflects directional light, increasing the image generation of the light emitted by the projector 102 when the light impacts the target area 116. Additionally, this feature may act to conceal parts of the object 110 from view during a performance, e.g., the audience is less likely to see the mechanical components which are reflecting the directional light since the directional light is more likely to be reflected than ambient environment light.

With reference to FIG. 3, after operation 306, the method 300 may proceed to operation 308. In operation 308 the motion for the object may be determined. For example, the motion track M for the object 110 may be selected, programmed, choreographed, or otherwise predetermined. In some instances, only select aspects of the motion M of the object 110 are selected (e.g., a general movement path across the environment 120, with higher frequency motions, such as appendage movement in stage locations, undetermined. In other embodiments, such as with random movement or unpredictable movement, operation 308 may be omitted.

After operation 308, the method 300 may proceed to operation 310 and projection is initiated. This operation may include providing content to the projector 102, tracking and predicting positional information of the object 110 by the prediction and tracking modules 106, 108, and then generation and/or selection of content by the rendering module 104 to map to the object 110 and/or target area 116 in light the positional information. Examples of this operation 310 will be discussed in more detail with to FIG. 4.

Figure 4:
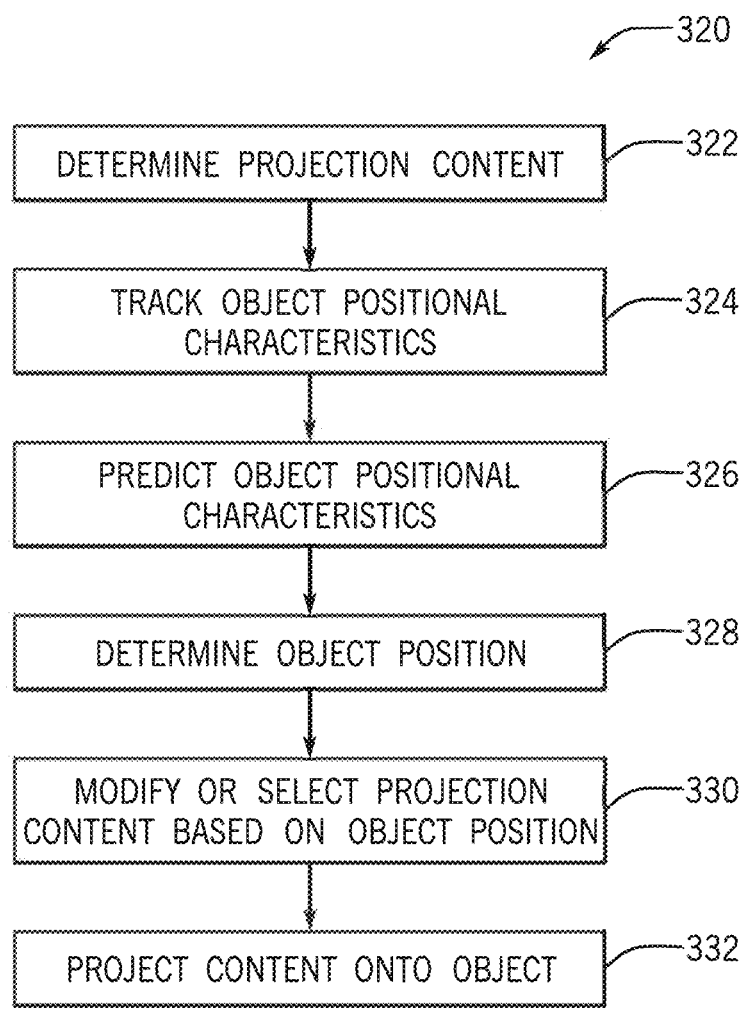
FIG. 4 is a flow chart illustrating a method for mapping projected light onto moving objects.

FIG. 4 illustrates a flow chart for a projection method to map and project light onto objects. With reference to FIG. 4, the method 320 may begin with operation 322 the projection content is determined. In particular, input content that is to be selected or modified based on positional information of the object 110 is determined. Examples of input content or original content may include light patterns, light colors, images, and the like. Other examples include, both visible and invisible light, as well as context, text, symbols, informational data, augmented reality content, or the like.

After operation 322, the method 320 proceeds to operation 324 and the tracking module 108 tracks positional characteristics of the object 110. Typically the object 110 will be moving, either randomly, semi-randomly, or along a known movement path M. As the object 110 moves, such as within the projection environment 120, the tracking module 108 detects the trackable positional information of the object 110. As discussed above, the tracking module 108 is more easily able to track the positional information given the tracking enhancement to the inherent object characteristics or other measures to increase contrast between the object and the environment. In some instances the increased contrast may be to allow the object to be more easily identified in tracked data (e.g., an image process algorithm can more readily identify the object in captured images).

In embodiments where the tracking information is insufficient to provide full positional information for the object 110 or if the traced information will be "stale" or introduce latency because the object 110 is moving faster than the tracking module 108 can track, the method 320 may proceed to operation 326. In operation 326, the prediction module 106 predicts complementary or supplemental object positional characteristics. For example, the prediction module 106 may use known information about the movement path M, atmospheric conditions, other inputs, to predict a future position (e.g., configuration and location) of the object 110. Other types of motion data used for prediction includes motion vectors (e.g., points with directional information), Cartesian coordinates, Boolean values, global positioning system data, external data, and the like.

It should be noted in many embodiments operation 324 and 326 will be completed simultaneously. For example, as the object 110 is being tracked by the tracking module 108, the prediction module 106 will be generating prediction information for the object 110.

Using the positional information from the tracking module 108 and the prediction module 106, the method 320 proceeds to operation 328 and a processing element or computer determines the object position. In one example, the tracking positional data is supplemented or filtered by the predicative positional data, such that the predicted data can act as a boundary or outer threshold to the tracked data. In other examples, the two types of data can be combined as a blended input to the computer to determine the complete positional data for the object 110.

Figure 5:
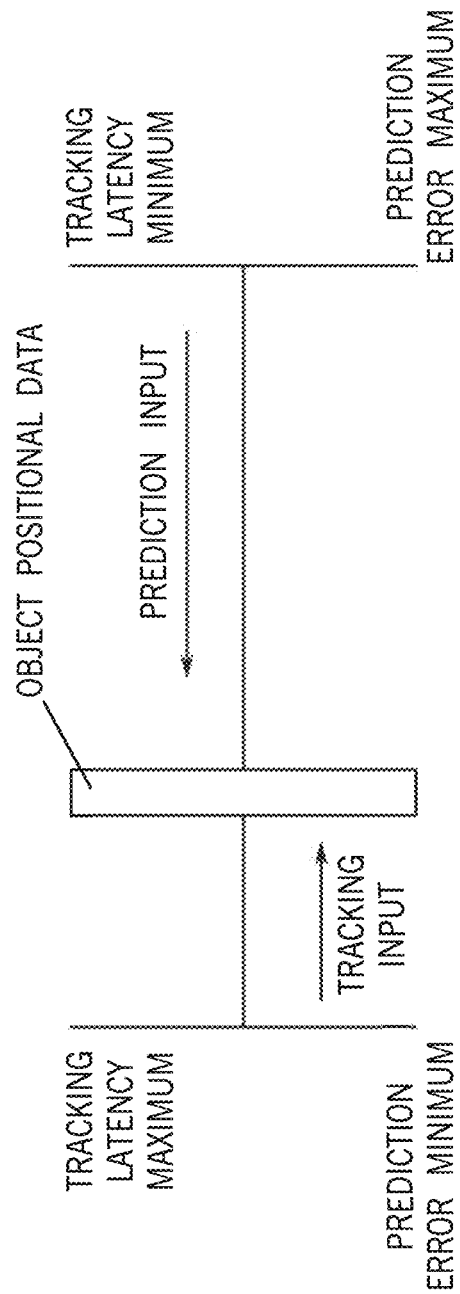
FIG. 5 is a graph illustrating variation of prediction and tracking inputs to the objection positional data used in the method of FIG. 4.

With reference to FIG. 5, the contribution amount or weight that the computer may apply to the tracking positional data as compared to the predicted positional data may depend on the projection environment 120, object movement, and types of projected content (e.g., dynamically rendered or selection of pre-rendered content). For example, as the tracking latency for a particular object or object motion increases beyond a desired threshold, the prediction data can be used to supplement the complete positional data and reduce the latency delay. Alternatively, as the prediction latency increases, such as due to complexity or computer timing, then the latency can be reduced by reducing the overall accuracy or amount of prediction and supplementing with the tracked data information.

Similarly, as the error increases for either the prediction data or the tracked data, the other type of data can be used to increase the accuracy. The contribution of the data types to the object positional data can thus be varied on a sliding scale or relationship that changes as the object becomes harder or more difficult to track or predict. The variation of contribution to the positional data can be done on an attraction or system basis or dynamically, e.g., as an object's movement changes to be unpredictable or the prediction has an error value over a select threshold, then the tracking data contribution will be increased or be weighted more heavily and vice versa. In other words, the two types of data can be used to offset the errors or latency issues derived with the other type of data. Examples of the relationship between the types of data include "if/then" types of analysis, thresholds, statistical analysis, artificial intelligence based decisions, situational (e.g., based on known choreography or other action, at a certain location or point in time, the system will increase the reliance on predicted data as compared to track data or vice versa), or the like.

As a specific example, with a flying vehicle, the vehicle will have on-board controls that can provide a first input as to the position of the vehicle (e.g., a gyroscope sensor), a secondary or external sensor, such as a global positioning system, can be used to provide a second input to the position of the vehicle, and then a tracking element, such as an IR tracking sensor can be used as third input.

With reference again to FIG. 4, after operation 328 and the position of the object 110, e.g., location, configuration or other three dimensional inputs, the method 320 may proceed to operation 330. In operation 330 the rendering module 104 modifies or selects the projection content based on the object position. In one example, the rendering module 104 uses three-dimensional positional information to modify original content to match the three dimensional position of the object 110 and/or target area 116. This may include rendering of content based on a three dimensional mesh of the target area 116 and/or projection object 110 or otherwise modifying the content based on the object position. In other examples, the content may be selected from previous generated or rendered content, e.g., based on the position of the object, the projection module 104 selects an appropriately shaped or formatted content for projection. This example may be used in instances where the movement of the object may be limited or the content may not vary extensively between object positions.

After the content is prepared, the method 320 may proceed to operation 322 and the projector 102 projects the content onto the projection object 110. For example, after the rendering module 104 prepares the content, the content is transferred or provided to the projector 102, which then emits light corresponding to the modified content onto the target area 116 of the projection object 110.

In one example, of the system 100, mechanically actuated nozzles may be moved in a predetermined pattern and may spray water in predetermined patterns. In this example, the mechanical motion of the nozzles is tracked by the tracking module 108, e.g., through a motor encoder that provides feedback as to the position of the motor, and the prediction module 106 will predict how, where, and what size the droplets of water will be and go when sprayed out of the nozzles, such as by taking into account fluid characteristics (type, pressure, velocity), nozzle information, and atmospheric conditions. In this manner, the projection module 104 can generate content mapped to each droplet, which is then projected onto the droplets by the projector 102. Also, in this example, the tracking module 108 may further use tracking information about the water itself (e.g., IR signature), to track the water after it leaves the nozzles.

Figure 6:
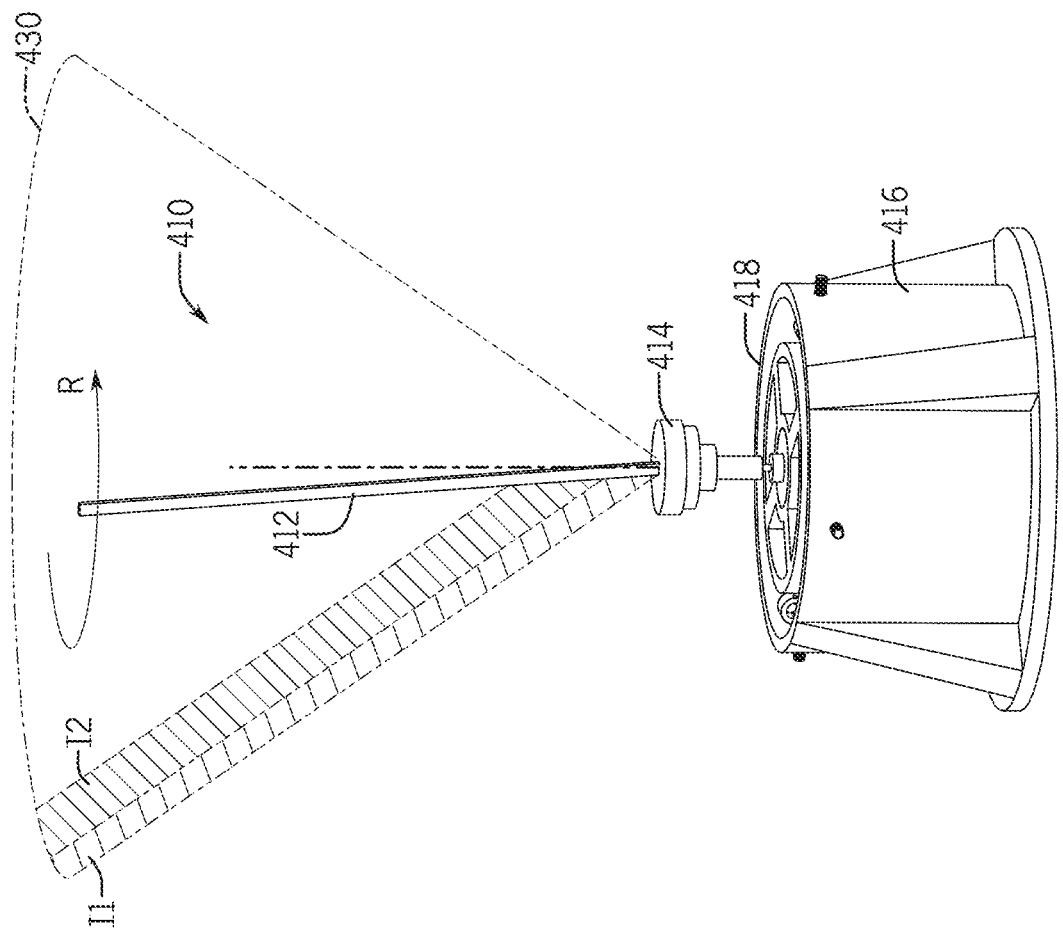
FIG. 6 is an isometric view of a first example of a projection object.
Figure 7A:
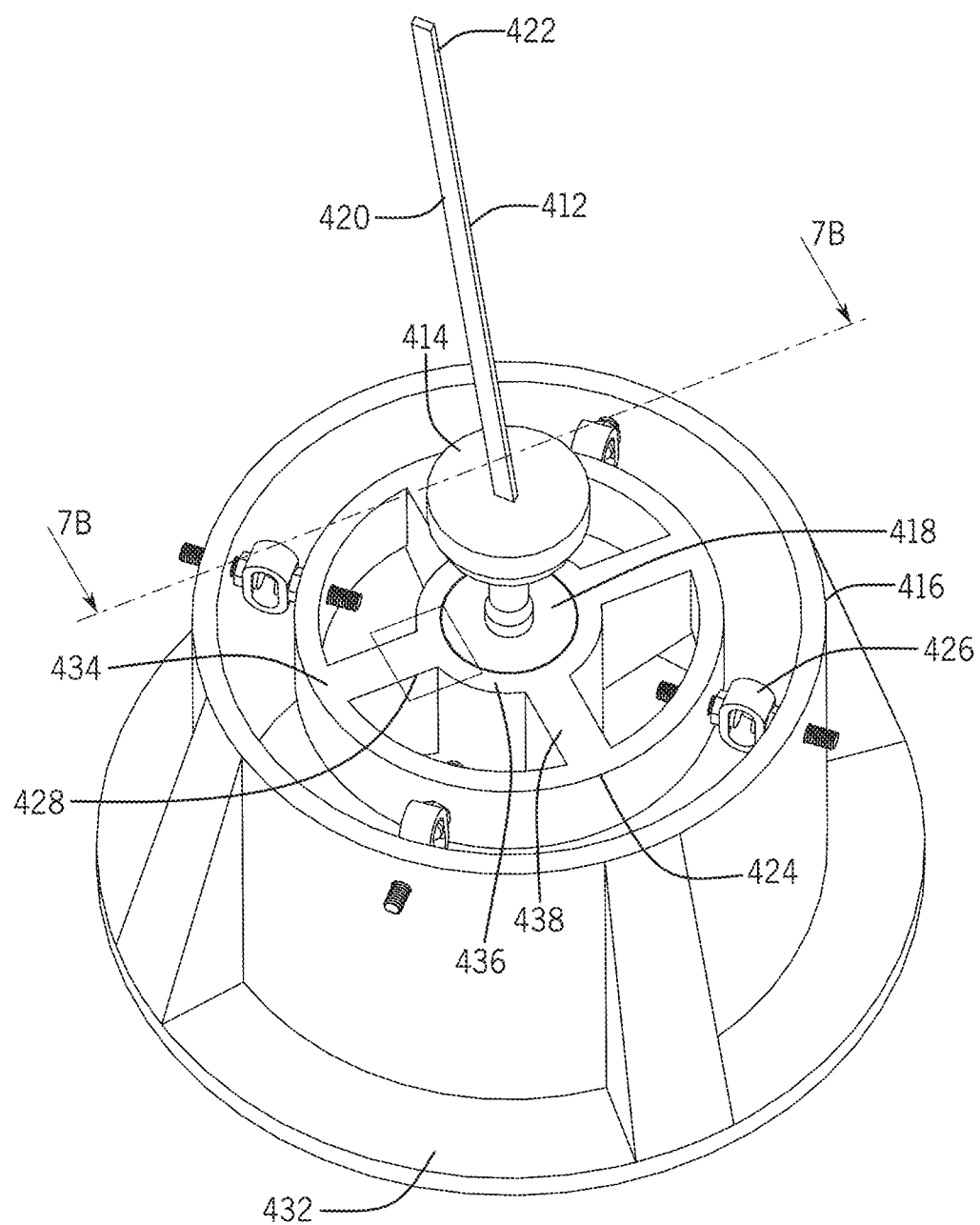
FIG. 7A is a top isometric view of the projection object of FIG. 6.
Figure 7B:
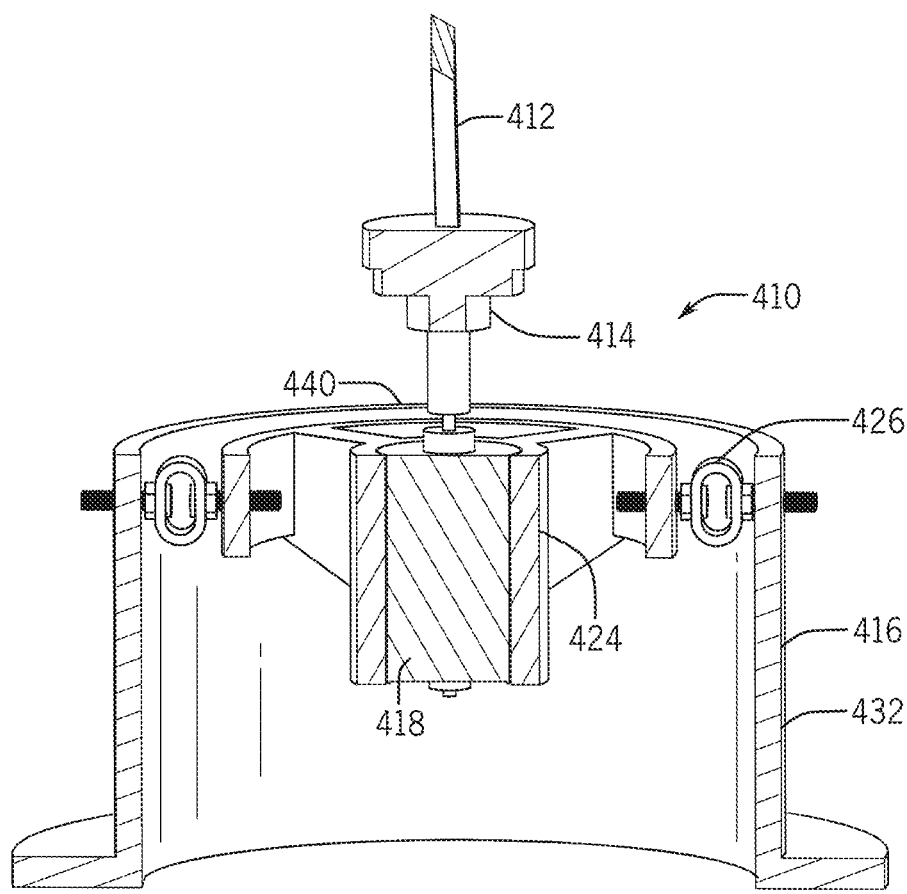
FIG. 7B is a cross-sectional view of the projection object of FIG. 6 taken along line 7A-7A in FIG. 7A.
Figure 8:
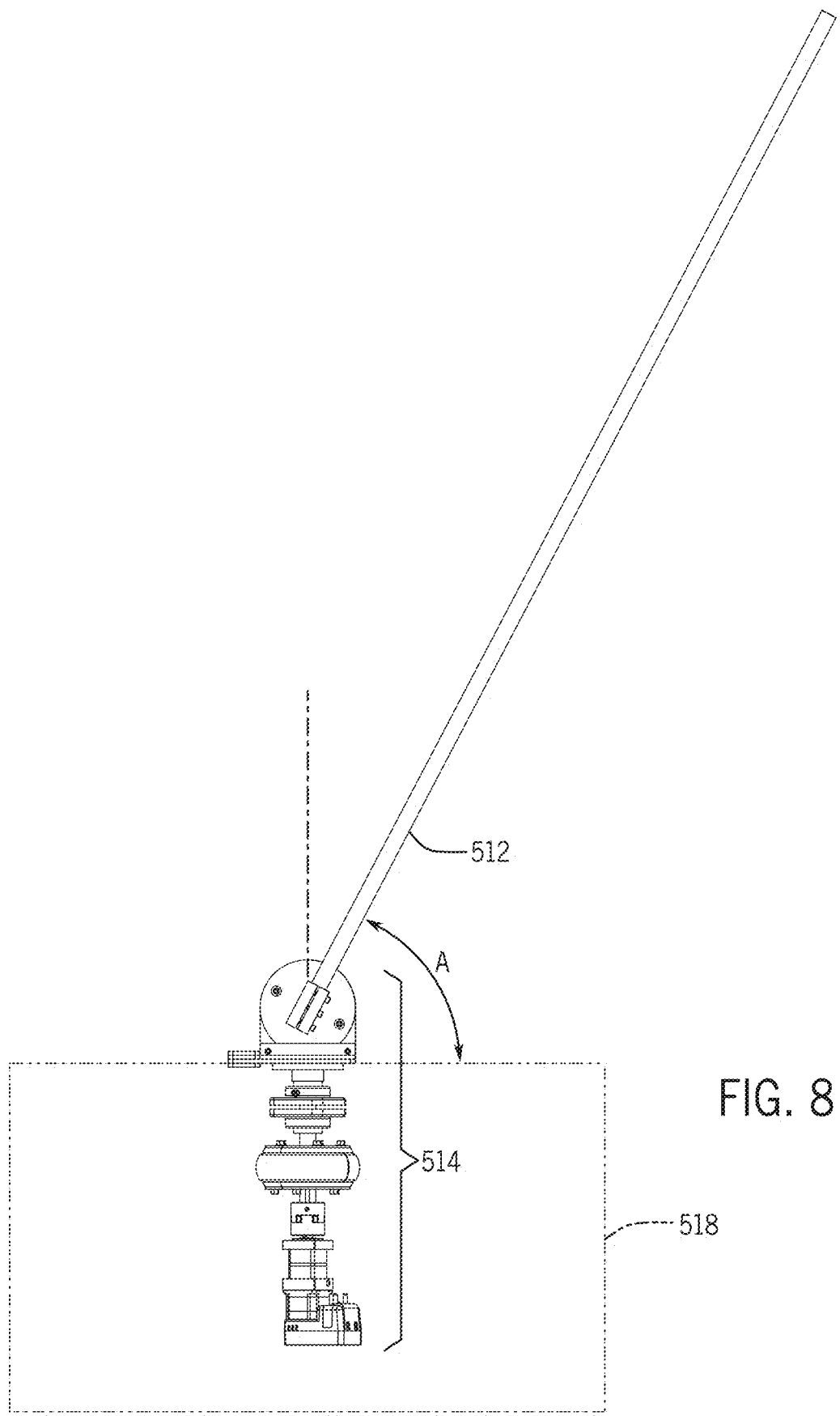
FIG. 8 is a front elevation view of a second example of a projection object.

FIGS. 6-8 illustrate various views of a projection object for use with the projection system 100. As noted above, the projection object 110 may be quickly moving object with a projection surface. In the examples shown in FIGS. 6-8, the projection object 110 is a rotating bar that rotates to define a volume and is projected onto by various projectors 102 at different angles to generate a three-dimensional appearing image. As the bar rotates it is mapped by the various projectors using techniques described in FIG. 4, which allows the projected content to directly correspond to the position of the bar, without blow by or other artifacts to generate a hologram type image.

With reference to FIGS. 6 and 7, in this example, the projection object 410 may include a projection bar 412, a mounting base 414, a motor 418, and optionally a support stand 416 and a securing element 428.

The bar 412 may be an elongated member configured to define a projection volume 430 as it rotates, where the projection volume 430 defines a geometric space for the image to appear on the outer perimeter thereof. The elongated shape of the bar 412 allows a projection surface with reduced mass and that may be sufficiently thin to be unobtrusive to a viewer. The projection bar 412 may have a width sufficiently wide to interact with light from the projector 102, but sufficiently small to be unobtrusive to a viewer. Illustrative widths include 0.100 to 0.150 inches or between 0.100 to 0.125 inches. In particular, the smaller the width of the rod bar 412, the smaller percentage of the image volume 430 it occupies, becoming more transparent to the viewer during operation. The length of the bar 412 is selected based on a desired area of the projection volume 430, e.g., for a human size hologram, the bar 412 may be range between 5 feet to 6 feet in length.

The cross-sectional shape or profile of the projection bar 412 may be selected based on the desired image generation. In some embodiments, the projection bar 412 may have a circular shape, a rectangular shape, a V or triangular shape, or prism shape, as some examples. In instances where the projection bar 412 has a rectangular cross section or a larger front face surface, the image formed by reflected light may appear brighter since the projection area or plane on the bar 412 is larger. In instances where the projection bar 412 has a circular cross section, the image may be dimmer, but may be easier to rotate, since it may have a tendency to remain more rigid.

The projection bar 412 includes a target area 420 and a non-target area 422, which in some instances, may be a front side and rear side, respectively, of the bar 412. As discussed with respect to FIG. 3, in some instances, the target area 420 may be enhanced to allow more accurate tracking and/or enhance the projected image. In one example, the target area 420 includes an ambient light rejecting projection material and the non-target area 422 includes a light absorbing material, e.g., black fabric such as velvet or felt, black paint, Duvetyne, Vanta Black, or the like. In this manner, the target area 420 will diffuse ambient or non-directional light that impacts its, but strongly reflect directional light, forming an image. Similarly, the non-target area 422 will absorb all light, making it seemingly invisible to a viewer. It should be noted that the target area 422 may extend only along a portion of the projection bar 412, which may allow more easy variations of the projection volume.

The bar 412 may be formed of a variety of different materials, but in some examples is carbon fiber, making it light weight, thus more easily rotatable, but strong. In instances where carbon fiber is used, the carbon fiber may be formed through a pultrusion process, which may increase the rigidity of the bar. However, other materials, such as metals and alloys, may be used depending on the desired application, height, and/or width of the bar. In many embodiments, the bar 412 material is selected to ensure that the bar 412 is sufficiently rigid to not substantially change shape or warp as it is rotated by the motor 418.

The mounting base 414 acts as a mounting assembly or linkage and couples the bar 412 to the motor 418 to allow the bar 412 to rotate as driven by the motor 418 or other drive assembly. In some embodiments, the bar 412 is located off-center from a center axis of the mounting bar 414. The mounting angle of the bar 412 relative to the mounting base 414 is selected based on the projection volume 430, such that increasing angle may increase the projection volume 430, until a maximum angle is reached, where the projection face of the target area 412 does not adequately interact with the projected light. The angle may also depend on the location of the various projectors relative to the mounting base 414.

The motor 418 is substantially any type of drive mechanism that can introduce a rotation into the mounting base 414. For example, the motor 418 may be an A/C servomotor with a drive shaft and encoder, but in other examples, different types of motors 418 or drive components may be used. The type of motor 418 depends on the load of the bar 412, and in some instances a larger bar may require a stronger motor, e.g., ¼ to 1 horse power motor to rotate the bar 412 at the desired speed.

In some embodiments, the motor 418 maybe registered to the projector to allow synchronization between the two components. The motor 418 may include a drive shaft 440 that translates motion to the projection bar 412. The rotations per minute of the drive shaft 440 may be selected based on the frame rate of the projector 102, as well as the desired imaging effect. In some examples, the rotations per minute (RPM) are selected to be between 200 and 400 RPM and often around 300 RPM. In embodiments where 300 RPM is used, the image often appears as a "solid" image, rather than a strobed light effect, but the slower the motor speed, the less solid the image may appear. Often the motor 418 speed is selected to substantially match or correspond to the projection frame rate, such that increases in one will correspond to an increase in the other. This ensures that the projected light can be projected sufficiently fast to match with the varying position of the bar 412 as it is moved.

The securing stand 416 supports the projection object 410 on a surface. The securing stand 416 may be configured to reduce the transmission of vibrations between the object 410 and the support surface and in some examples. In some instances, the securing stand 416 includes an internal support 424 spaced apart from but positioned within an outer support 432. In one example, the internal support 424 may have a central hub 436 connected by interspaced spokes 438 to an external hub 434 and the external hub 434 is coupled to the external support 434. In the example shown in FIG. 7, the internal support 424 is anchored to the outer securing stand 416 by one or more mounts 426, which in some embodiments may be vibration reduction members. In the example shown in FIG. 7A, the mounts 426 include rubber dampeners coupled to the internal support 424 and the external support 432. This layered connection helps to reduce vibrations from being transmitted between the motor 418 and/or mounting base 414 and the outer securing stand, which can reduce noise.

In many embodiments, the securing stand 416 may be covered with an aesthetic cover to conceal the various components of the projection object 410, such that the projection bar 412 will be the only visible component of the object 410, allowing a more realistic image generation for the hologram.

In some embodiments, a guide track may be positioned around the bar 412, either along a top and/or bottom end, or along a center area. The guide track helps to guide the rotation of the bar 412 along the rotation path R and ensure that the movement is in the desired manner. The guide track may allow for more accurate movement profiles, which in some instances may reduce the tracking processing required for mapping the object.

In some embodiments a supplemental securing element 428 may be operably coupled to the projection object 420, such as between the projection bar 412 and the securing stand 416. The supplemental securing element 428 provides a backup support in the event of a malfunction, wear and tear, mechanical failure, or the like, to ensure that the projection bar 412 and/or mounting base 414 do not move outside of the designated movement path.

For example, the supplemental securing element 428 may be a securing chain, a cable, or the like. In one example, the securing element 428 is a cable that connects to the projection rod 420, such as through a eyelet loop or other connection and then is secured to the securing stand 416 and/or support surface, such that if the mounting base 414 and projection bar 412 disconnect, the cable will limit the movement of the bar 412.

In another example, the projection bar 412 may include a conductive material, such as carbon fiber, and the securing element 428 is a conductivity sensor or circuit that detects continuity, such as through varying resistance, within the bar 412. As the rod wears 412 and splintering is introduced, the securing element 428 can detect the variation in resistance and/or continuity and when the change is above a select threshold, send an alert. In yet another example, the supplemental securing element 428 may integrated into the motor 418, such as a torque feedback sensor, and as the torque of the motor varies over a select threshold, an alert may be transmitted to a computer. In these instances the variation in torque may be the result of changes in characteristics of the rod itself.

With reference to FIGS. 6-7B, to assemble the projection object 410, the motor 418 is positioned within the internal hub 436 of the internal support 424 of the support base 416. The internal support 424 may be coupled to the external support 432 of the support base 416, such as through connection of the mounts 426. The bar 412 is mounted such that a bottom end is secured to the mounting base 414, such as through adhesive, welding, or the like, which is then coupled to the motor 418, e.g., coupled to a drive shaft 440 of the motor, such that rotation of the drive shaft 440 will cause the mounting base 414 and bar 412 to rotate correspondingly.

In many embodiments, the projection rod 412 is mounted at an angle relative to a center axis of the mounting base 414 and/or support structure 416. For example, in some embodiments, the bar 412 may be mounted at an angle between 20 to 40 degrees and in some embodiments is set around 30 degrees. The angle is based on the desired image volume 430 caused by the reflected light on the projection bar 412 along the rotation path R, and in embodiments where an angle of 20 to 40 degrees is used, a cone shaped projection volume 430 is formed.

In operation, the projection object 410 may be positioned such that multiple projectors 102 can project light that will impact the bar 412 along its rotation path R. For example, a set up similar to that shown in FIG. 2A may be used. Once the projection object 410 is positioned, the motor 418 is activated, the drive shaft 440 rotates, causing the projection bar 412 to rotate correspondingly along the rotation path R. Due to the mounting angle, the bar 412 rotates within the projection volume 430, which in some instances may be a conical shape. As the bar rotates 412 into a field of view of each projector, the projection system 100 maps the projection onto the target area 420 of the bar 412 and the directional light reflects generating a viewable image. For example, as shown in FIG. 6, two image portions I1 and I2 may be formed at different locations along the rotation path R, with the full image volume formed by I1 to In. In embodiments where the non-targeted area is concealed, such as through absorptive materials, the image portions are prevented from being reflected on the non-targeted area 422 which may prevent light from appearing within an internal portion of the image volume 430. In other words the image may appear only along the outer perimeter of the volume 430. In some examples, the full image may appear as a cylindrical or conical shape with a "void space" appear in the middle, but from the projection locations, the void space appears filled with the image since the viewer will be appear to be seeing a full 3D object.

Figure 9:
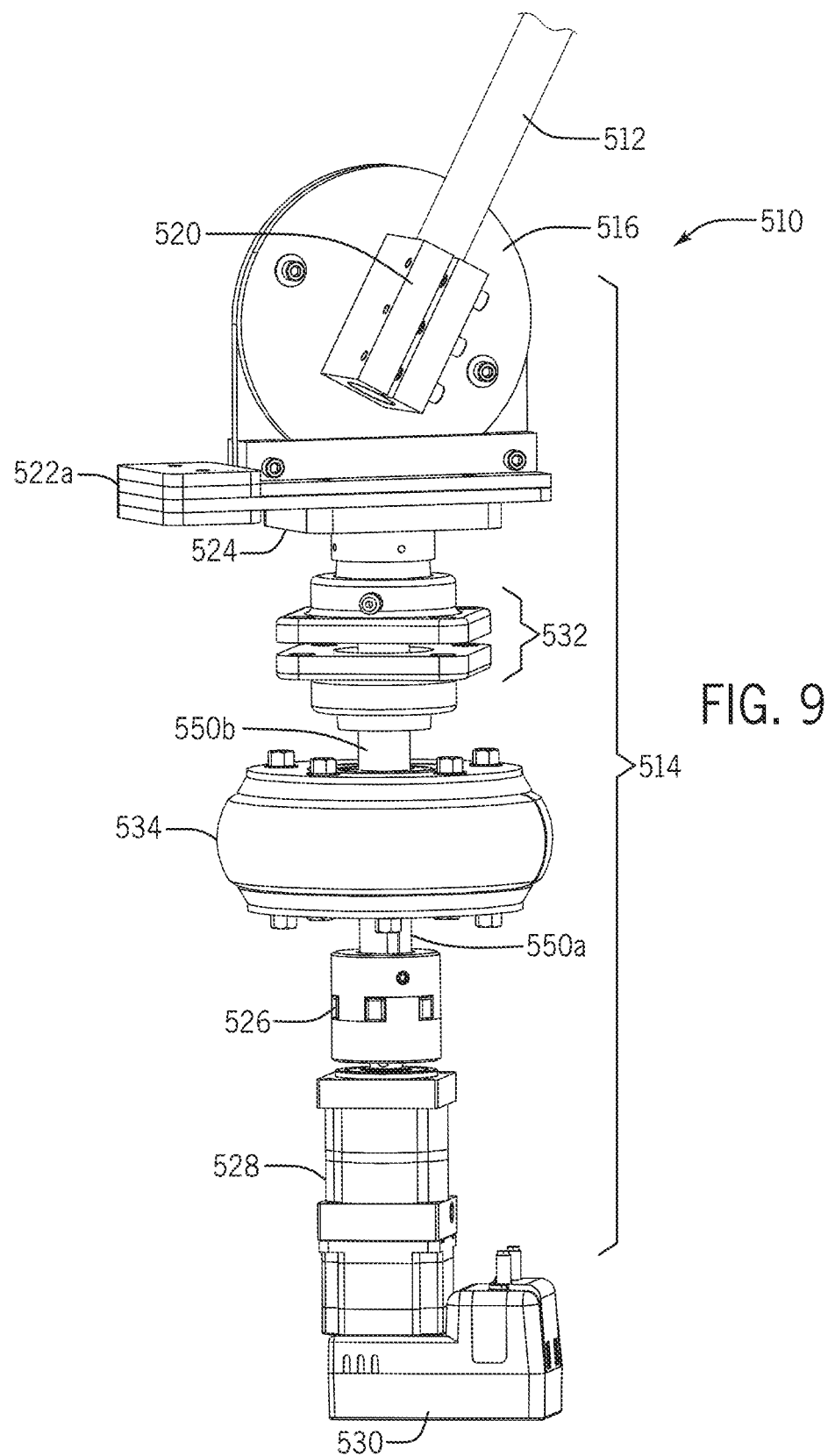
FIG. 9 is an enlarged view of the projection object of FIG. 8.

FIGS. 8-12 illustrate another example of a projection object 510 for use the projection system 100. In this example, the projection object 510 may include a linkage coupling between the motor and the bar, as well as variations of the mounting supports and base. As shown in FIGS. 8 and 9, the projection object 510 may include a drive linkage 514 that couples the bar 512 to the motor 530. The drive linkage may include a mounting assembly 516, optional bearings 532, drive shafts 550a, 550b, a link coupler 534, a flexible coupling 526, and a driven member 528. In this example, the movement of the bar 512 may be unguided by a separate frame or track element, which may eliminate wear and tear for friction along the guided track.

The motor 530 may be substantially the same as the motor 418, but in instances where the bar 512 may be longer, such as for an increased projection volume, the motor 530 may have increased power and/or faster speed.

The motor 530 includes a drive shaft that is operably connected to the driven member 528. The driven member 528 acts to transfer the movement and torque from the motor 530 to the drive shaft 550*a*. The driven member 528 may be an extension of the motor drive shaft, directly connected to the drive shaft, formed via a cam connection, or the like.

The linkage assembly 514 may include multiple coupling elements, such as flexible coupling 526 that may include flexible couplers that transfer motion in a flexible connection, link coupler 534 that transfers motion from drive shaft 550*a* to upper drive shaft 550*b*. In some embodiments, the linkage may be selected to allow a circular movement of the bar, even when the drive shafts may be out of alignment. As well as friction reducing elements, such as bearings 532 that allow the drive assembly to connect to a base structure, without the introduction of fiction (see, e.g., FIG. 12). The types of components for the couplers and bearings 532 may be varied as desired depending on the type of structure, size the projection volume, and projection surface characteristics. As such the discussion of any particular functionality or component is meant to be illustrative only.

Figure 11:
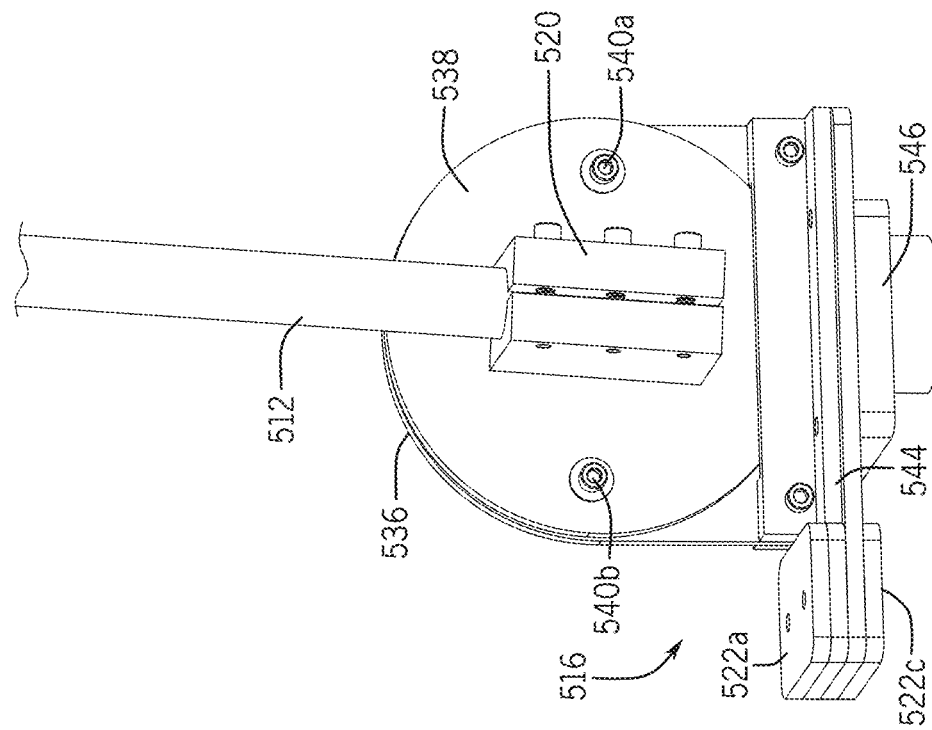
FIG. 11 is a right side isometric view of the mounting assembly of FIG. 10.
Figure 10:
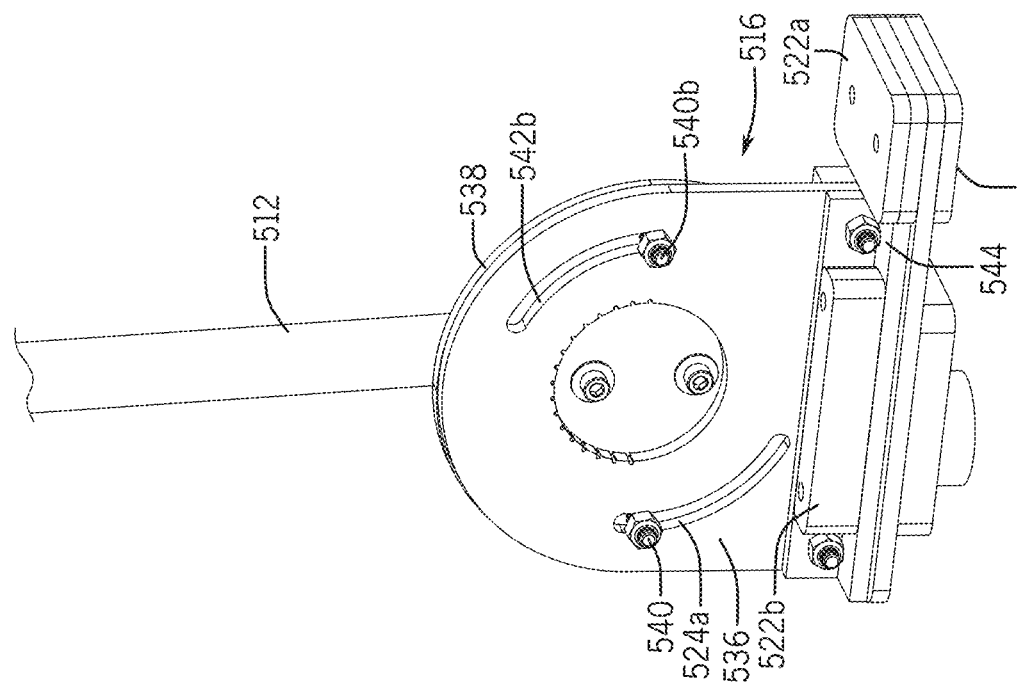
FIG. 10 is a left side isometric view of a mounting assembly for the projection object.

The mounting assembly 516 allows the angle A of the projection bar 512 to be selectively adjusted depending on a desired projection volume, as well as transfer motion from the drive assembly 516 to the projection bar 512. With reference to FIGS. 10 and 11, the mounting assembly 516 may include a movable mount 538, a stationary mount 536, a bar clamp 520, one or more counterweights 522*a*, 522*b*, 522*c*, a bracket base 544, as well as one or more fasteners 540 to secure the various components together.

The mounts 536, 538 may be substantially similar to one another, but the stationary mount 536 may include one more positioning tracks 542*a*, 542*b* defined therein. For example, in one embodiment, there may be two positioning tracks 542*a*, 542*b* each defined on opposite sides of the exterior face of the stationary mount 536 and formed as semi-circular depressions. Additionally, a central positioning depression may be formed between the two positioning track 542*a*, 542*b*.

The bracket base 544 supports the mounts 536, 538 and counterweights 522*a*, 522*b*, 522*c* and in some embodiments may be formed as a substantially planar support surface.

The counterweights 522*a*, 522*b*, 522*c* offset the weight of the bar 512 and possible eccentric weighting of the mounting assembly 516 during rotation caused by the angle A of the bar 512 relative to the bracket base 544. In other words, the counterweights act to balance the load generated be the rotation of the bar, to allow fast rotation of the bar without vibrations or shaking. The counterweights 522*a*, 522*b*, 522*c* may be formed of substantially any type of weighted material and may be arranged and stacked at specific locations depending on the imbalance caused by the angle A. In embodiments where the angle A does not cause a large imbalance and/or the bar 512 weight is light, the counterweights may be omitted.

The bar 512 of the projection object 510 may be substantially the same as the bar 412. However, as shown in FIGS. 8 and 9, the bar 512 may have a circular cross section as compared to the rectangular or prism shaped cross section of bar 412 in FIG. 6. However, the cross section of the bar may be varied as desired depending on the desired projection characteristics of the image formed in the projection volume.

Figure 12:
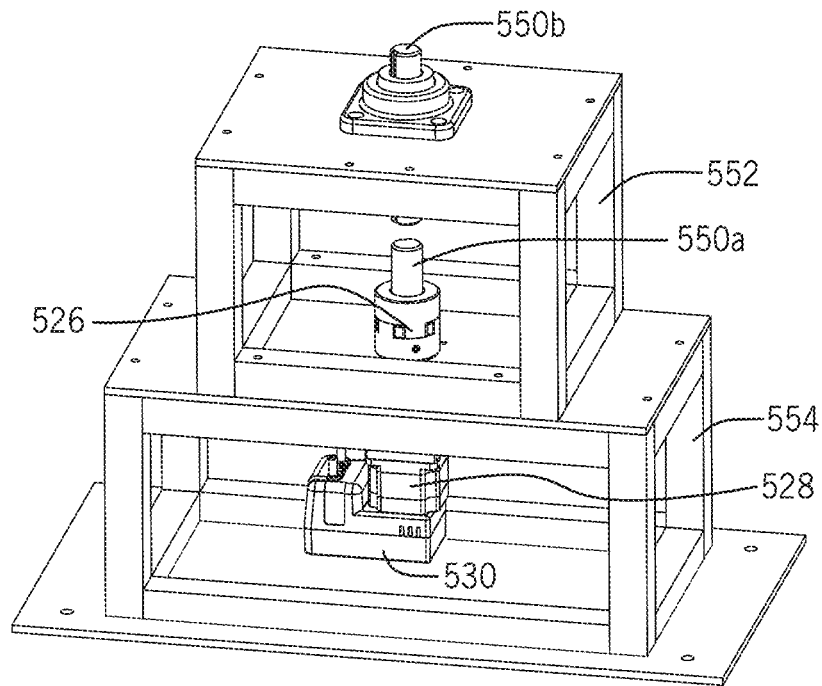
FIG. 12 is a front isometric view of a support frame for the projection object of FIG. 8.

With reference to FIG. 12, the projection objection 510 may be supported on a surface by a base, which in some embodiments may be defined as a frame having an upper frame 552 supporting select portions of the drive assembly and a lower frame 554 supporting the motor 530 and other drive assembly components. The frame 552, 554 may be formed as desired, depending on the projection environment or application. In many instances the frame 552, 554 may be configured to support the weight and movement of the bar 512, while also allowing aesthetic or covering elements to cover the operational components of the object 510.

In one example, the motor 530 and driven member 528 are coupled to the lower frame 544 on a first or bottom side of a support surface. The drive shaft 550*a* may then extend through the top wall of the support surface to couple with flexible coupling 526 and drive shaft 550*b*. Further, link coupling 534 may connected around both drive shafts 550*a*, 550*b* to transfer motion from drive shaft 550*a* to drive shaft 550*b*. Drive shaft 550*b* is secured to the upper frame 552 by bearings 532, which allow the drive shaft 550*b* to rotate within the bearings, while remaining operably coupled to the frame 552. The top bearing 532 and drive shaft 550*b* are then coupled to the bottom bracket 546 of the mounting assembly 516.

As assembled, the projection bar 512 may be secured to the movable mount 538 by a securing clamp 520. As shown in FIG. 11, the securing clamp 520 is anchored to the exterior face of the mount 538. The two mounts 536, 538 may be aligned to one another at the desired angle and then secured together via fasteners 540. In embodiments where the extension angle of the bar 512 is desired to be changed, the mounts are disconnected and one or both is rotated relative to the another until the desired angle is achieved. It should be noted in embodiments where the projection object 510 is used with a static projection show, the mounts may be rigidly connected in a predetermined angle.

The two mounts 536, 538 are connected to the bracket base 544, which is in turn secured to the bottom bracket 546. The counterweights 522*a*, 522*b*, 522*c* may be positioned and secured at various locations along either the bracket base 544 and/or the bottom bracket 546. In some embodiments, counterweights 522*a*, 522*c* may be positioned at an opposite end of the brackets from the mountings 536, 538. However, the counterweight locations may be varied based on the counterweight characteristics and imbalances imparted and thus the examples shown are illustrative only.

Operation of projection object 510 may be substantially similar to the operation described with respect to projection object 412. In one embodiment, as the motor 530 rotates, the drive shaft transfers motion to the driven member 528, which through the various couplings in the drive assembly 514, transfers motion to the mounting assembly 516. As the mounting assembly 516 rotates relative to the frame 552, 554, the projection bar 512 rotates therewith and defines the projection volume for the image projection. As the projection bar 512 rotates, the system 100 maps the projection onto the bar 512 and a volumetric image is formed.

Figure 13:
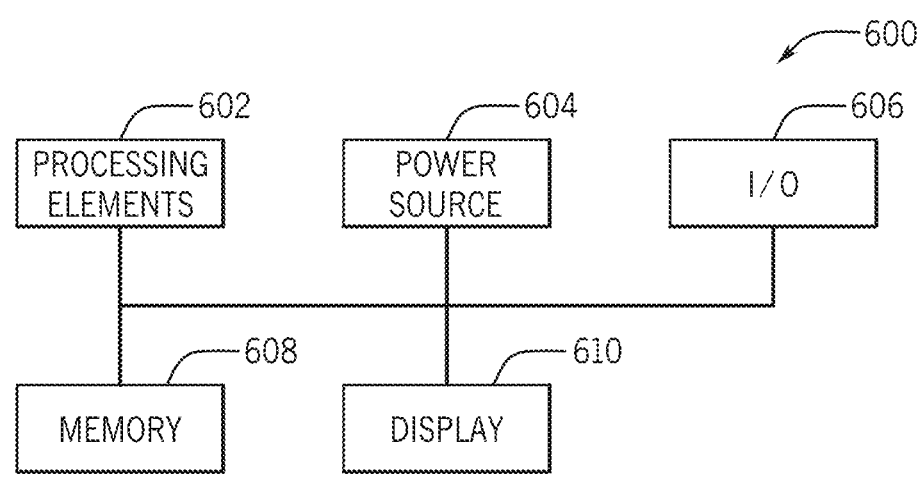
FIG. 13 illustrates a simplified block diagram of a computer for use with the system of FIG. 1.

It should be noted that various elements of the system 100 may be connected to, incorporated within, or in communication with a computer, computing element, server, or the like. FIG. 13 illustrates a simplified block diagram of a computer for use with the system 100. The computer 600 may include one or more processing elements 602, a power source 604, an input/output interface 606, one or more memory components 608, and optionally a display 610. Each of the components may be connected via direct connections, hardwire, or via wireless connections.

The processing element 602 is any type of electronic device capable of processing, receiving, and/or transmitting instructions. For example, the processing element 602 may be a microprocessor or microcontroller. Additionally, it should be noted that select components of the computer 600 may be controlled by a first processor and other components may be controlled by a second processor, where the first and second processors may or may not be in communication with each other.

The memory 608 stores data used by the computer 600 to store instructions for the processing element 602, as well as store positional and content data for the system 100. For example, the memory 608 may store data or content, such as images, graphics, and the like. The memory 608 may be, for example, magneto-optical storage, read only memory, random access memory, erasable programmable memory, flash memory, or a combination of one or more types of memory components.

A power source 604 provides power to the components of the computer 600 and may be a battery, power cord, or other element configured to transmit power to the computer components.

The display 610 provides visual feedback to a user and, optionally, can act as an input element to enable a user to control, manipulate, and calibrate various components of the system 100. The display 610 may be any suitable display, such as a liquid crystal display, plasma display, organic light emitting diode display, and/or cathode ray tube display. In embodiments where the display 610 is used as an input, the display may include one or more touch or input sensors, such as capacitive touch sensors, resistive grid, or the like.

The I/O interface 606 provides communication to and from the various modules 104, 106, 108, projector 102, and the computer 600, as well as other devices (e.g., other computers, auxiliary scene lighting, speakers, etc.). The I/O interface 606 can include one or more input buttons, a communication interface, such as WiFi, Ethernet, or the like, as well as other communication components, such as universal serial bus (USB) cables, or the like.

It should be noted that the projection, tracking, and prediction techniques described herein can be used in multiple applications and systems. The discussion of any particular projection objects, e.g., objects in FIGS. 6-12, are meant as illustrative only. The low system latency provided by the projection techniques allows for projection of unique and individualized content onto rapidly moving objects, complexly shaped objects, by intelligent application of computational resources.

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A projection system for generating a volumetric image comprising:
   a tracking module for tracking first positional characteristics;
   a prediction module for determining second positional characteristics;
   a projection module in communication with the tracking module, wherein the projection module projects light; and
   a projection object positioned within a field of view of the projection module, the projection object comprising:
      a target area selected to interact with the projected light to generate an image portion; and
      a motor in communication with the tracking module, the motor operably coupled to the target area for moving the target area along a movement path, wherein as the projection object moves along the movement path a projection volume is defined;
   wherein
   as the motor moves the target area, the tracking module tracks the first positional characteristics of the projection object, the prediction module determines the second positional characteristics of the projection object, and a processing element blends the first positional characteristics and the second positional characteristics to determine a position of the projection object and provides the position of the projection object to the projection module;
   the projection module generates content for projection onto the projection object at discrete locations along the movement path based on the position of the projection object and projects the content onto the target area as the object is moved into each location by the motor; and
   the content projected at each discrete location defines a plurality of image portions along the movement path, wherein the image portions define the volumetric image.

2. The projection system of claim 1, wherein the target area comprises an ambient light rejecting property.

3. The projection system of claim 1, wherein the projection object further comprises a non-target area, wherein the non-target area comprises a light absorptive property.

4. The projection system of claim 1, wherein
   the tracking module tracks positional characteristics of the object to determine a second object position and provides the second object position to the projection module; and
   the projection module generates content for projection onto the object at a second location based on the positional characteristics and projects the content onto the object as the object is moved into the second location by the motor.

5. The projection system of claim 1, wherein the image portions are formed at an outer perimeter of the projection volume.

6. The projection system of claim 1, wherein the target area is formed by a bar coupled to the motor and the movement path is a circular rotation path.

7. The projection system of claim 6, wherein the target area is a front face of the bar and comprises an ambient light rejecting film.

8. The projection system of claim 1, wherein the projection volume is conically shaped.

9. The projection system of claim 1, wherein the projection object further comprises a mounting base for coupling the target area to the motor, wherein the target area is positioned at an angle relative to a center axis of the mounting base.

10. A projection system for projecting images onto a moving object, the system comprising:

a tracking module for determining a first type of position data for the moving object, wherein the first type of position data comprises a random movement of the moving object;

a prediction module for determining a second type of position data for the moving object, wherein the second type of position data comprises a predictable movement of the moving object;

a projection generation module in electrical communication with the tracking module and the prediction module, wherein the projection generation module generates an image for projection on the moving object based on a combination of the first type of position data and the second type of position data; and a projector in electrical communication with the projection generation module, wherein the projector projects the image onto the moving object.

11. The projection system of claim 10, wherein the combination is determined by at least one of a latency or an error for each the first type of position data or the second type of position data.

* * * * *

UNITED STATES PATENT AND TRADEMARK OFFICE
CERTIFICATE OF CORRECTION

PATENT NO. : 11,022,814 B2  
APPLICATION NO. : 15/981706  
DATED : June 1, 2021  
INVENTOR(S) : Joseph et al.

Page 1 of 1

It is certified that error appears in the above-identified patent and that said Letters Patent is hereby corrected as shown below:

On the Title Page

In item (72) delete:
"Daniel M. Joseph, Windermere, FL (US); Dumene Comploi, Los Angeles, CA (US); Jessica A. Klouda, Lisle, IL (US); Thomas F. LaDuke, Orange, CA (US); Edgar F. Mahnke IV, Winter Garden, FL (US); Mark A. Reichow, Santa Clarita, CA (US); Thomas T. Tait, Santa Clarita, CA (US)"

And insert:
--Daniel M. Joseph, Windermere, FL (US); Dumene Comploi, Los Angeles, CA (US); Jessica A. Klouda, Lisle, IL (US); Thomas F. LaDuke, Orange, CA (US); Edgar F. Mahnke IV, Winter Garden, FL (US); Mark A. Reichow, Santa Clarita, CA (US); Thomas T. Tait, Santa Clarita, CA (US); Eli Joseph Romaire, Los Angeles, CA (US); Jonathan Harris Sangel, Tarzana, CA (US); Terry Orion Sandin, Los Angeles, CA (US); Alex Christopher Merryman, Pasadena, CA (US)--

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*